United States Patent
Roberts et al.

(10) Patent No.: US 8,981,709 B1
(45) Date of Patent: Mar. 17, 2015

(54) SUPPLEMENTAL ELECTRICAL GENERATION APPARATUS AND METHOD

(75) Inventors: Claude Henry Roberts, Ocean Springs, MS (US); Richard Sowards, Ocean Springs, MS (US)

(73) Assignee: Edee, LLC, Biloxi, MS (US)

( * ) Notice: Subject to any disclaimer, the term of this patent is extended or adjusted under 35 U.S.C. 154(b) by 405 days.

(21) Appl. No.: 13/573,107

(22) Filed: Aug. 22, 2012

(51) Int. Cl.
*H02J 7/04* (2006.01)
*H02J 7/00* (2006.01)

(52) U.S. Cl.
CPC *H02J 7/0042* (2013.01); *H02J 7/00* (2013.01)
USPC .......................................................... 320/101

(58) Field of Classification Search
USPC .......................................................... 320/101
See application file for complete search history.

(56) References Cited

U.S. PATENT DOCUMENTS

| | | | |
|---|---|---|---|
| 6,373,224 B1 * | 4/2002 | Goto et al. | 320/119 |
| 8,355,805 B2 * | 1/2013 | Ricket | 700/19 |
| 8,796,881 B2 * | 8/2014 | Davis | 307/69 |
| 8,798,830 B2 * | 8/2014 | Sobue et al. | 701/22 |
| 8,803,362 B2 * | 8/2014 | Schmiegel | 307/85 |
| 8,853,978 B2 * | 10/2014 | Hardison et al. | 318/294 |

* cited by examiner

*Primary Examiner* — Sun Lin
(74) *Attorney, Agent, or Firm* — J. Nevin Shaffer, Jr.

(57) ABSTRACT

A power generation device with a charge controller connected with the power generation device where the charge controller is adjustable so as to regulate power from the power generation device to maximum amounts acceptable for charging a particular battery. At least one battery where the number of batteries is selected to match the maximum power out from the power generation device such that the batteries are charged in a minimum charge time. A DC power port connected with the at least one battery. An inverter connected with the at least one battery for converting DC to AC and providing AC power where the inverter is adjustable and an AC power is port connected with the inverter.

20 Claims, 1 Drawing Sheet

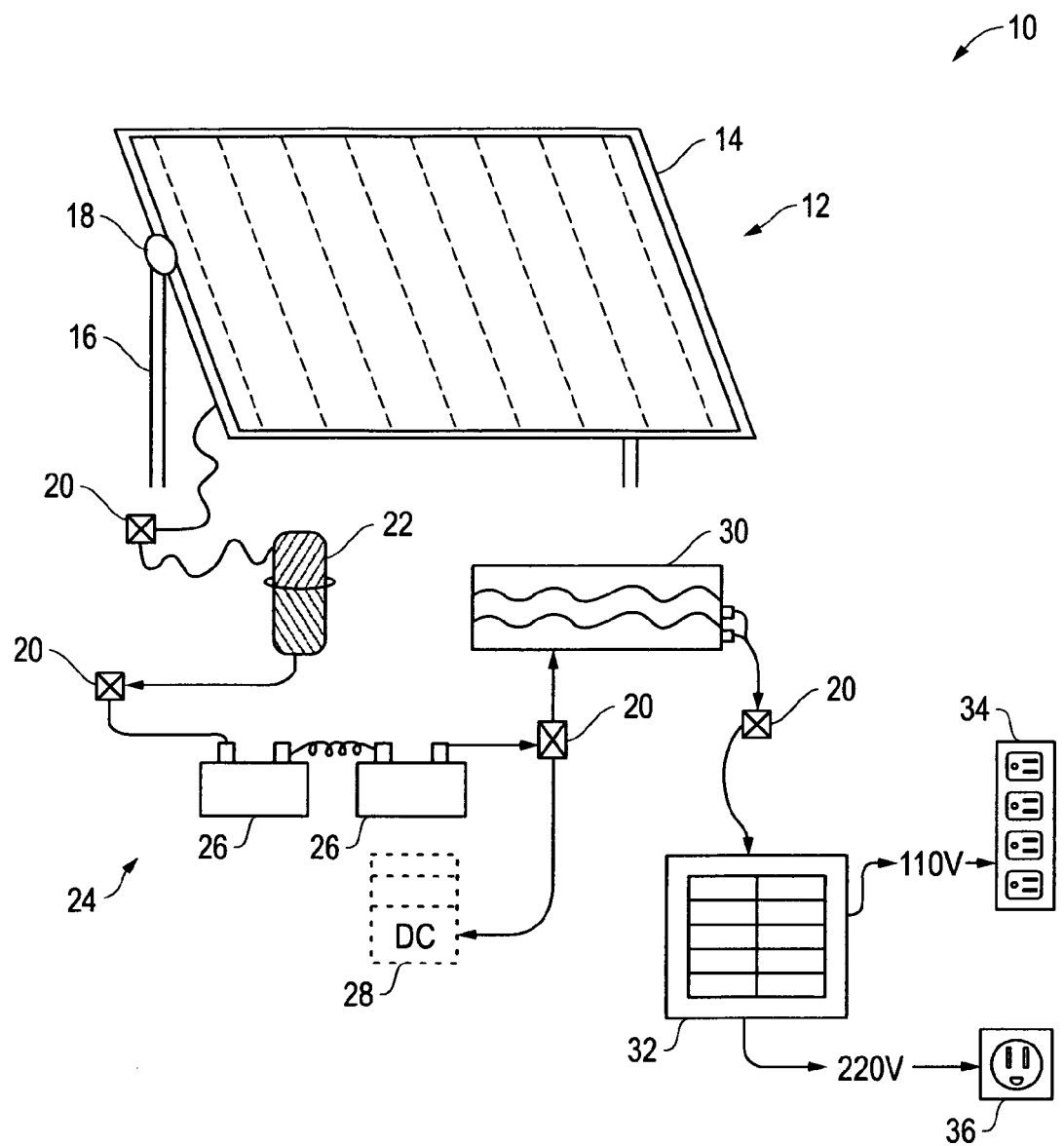

SUPPLEMENTAL ELECTRICAL GENERATION APPARATUS AND METHOD

FIELD OF THE INVENTION

This invention relates to an improved supplemental electrical generation apparatus and method. In particular, in accordance with one embodiment, the invention relates to an improved supplemental electrical generation apparatus consisting of a power generation device with a charge controller connected with the power generation device where the charge controller is adjustable so as to regulate power from the power generation device to maximum amounts acceptable for charging a particular battery. At least one battery with a particular battery strength and storage capacity and a particular charge time is connected with the charge controller where the capacity of the at least one battery is used to adjust the charge controller such that the at least one battery is charged to a selected maximum battery strength and storage capacity and where the number of batteries is selected to match the maximum power out from the power generation device such that the batteries are charged in a minimum charge time. A DC power port is connected with the at least one battery. An inverter is connected with the at least one battery for converting DC to AC and providing AC power where the inverter is adjustable so as to monitor the power status of the at least one battery and power demand and accepts power directly from the power generation device when the at least one battery is fully charged or accepts power directly from the at least one battery when the power generation device is not producing power and further, when no power is demanded, it directs power from the power generation device to the at least one battery when the at least one battery is below a preselected maximum power level. And an AC power is port connected with the inverter.

BACKGROUND. OF THE INVENTION

A problem exists with regard to the generation of electricity in useful amounts from supplemental electrical generation devices. Prior art devices such as gas and diesel generators provide adequate amounts of electricity for emergency situations, for example, but run on fuel that must be constantly replenished and are noisy while operating. They produce some amount of air pollutant and are not capable of effectively reducing the total consumption of electricity over the long run.

Alternative energy devices, solar, wind and geothermal, for example, obviate the need for combustible fuel but, heretofore, have not proved a reliable source of supplemental electricity. To begin with, they are expensive and, as currently available, they are not very reliable. Simply put, when the sun does not shine and when the wind does not blow these systems do not function. As the need for electricity is essentially constant, these devices are not suitable for a reliable supplemental system.

Alternative energy devices have attempted to solve the problem of operation during periods when the sun isn't shining, for example, by adding batteries to provide power in times of darkness. Applicants have determined that while the systems using batteries are able to function longer than those without, these prior art systems are woefully inadequate in actually providing reliable supplemental electricity. One problem is that very little if any thought is given toward matching the system to the need. That is, Applicant has found that systems exist and the user is simply asked to hook it up and see what benefit is obtained. Further, these systems are not matched or harmonized internally. When battery back up is required, batteries are simply added with no consideration of the battery capacities and power requirements. Still further, the combination of the power generation device, a solar panel, for example only and not by way of limitation, with a battery is also only superficially examined. The typical "solution" has been, if batteries are offered, the more batteries the better. This results in a system that, when running off of the batteries, upon depletion of the batteries, takes the system out of operation while the batteries are recharged. Under the "more batteries the better" scenario, recharging can take quite a long time.

A still further and related drawback to the prior art devices known to the Applicants is that they are either on battery power or off such that little consideration is given to battery power until is has been depleted through use and requires recharging. And further, the prior art of which Applicants are aware is typically limited to the provision of AC power.

Thus, there is a need in the art for a supplemental electrical generation system that does not create pollution or noise during operation, that is economical and reliable. It therefore is an object of this invention to provide a supplemental electrical generation system that is economical and reliable and that is quite and does not create pollution. Further, it is an object of the invention to provide a system that is adjustable to individual needs and is internally harmonized to function at maximum capacity whether running on or off battery power. Further, it is an object of the present invention to provide a system that detects battery depletion and recharges batteries during normal operation. Still further it is an object of the invention that the harmonized system provides for the best combination of power generation device and battery backup such that batteries are maintained and recharged in a minimum amount of time. It is a further object of the invention to provide a system that offers both DC and AC power options from a single unit.

SUMMARY OF THE INVENTION

Accordingly, in accordance with one embodiment, the invention relates to an improved supplemental electrical generation apparatus consisting of a power generation device with a charge controller connected with the power generation device where the charge controller is adjustable so as to regulate power from the power generation device to maximum amounts acceptable for charging a particular battery. At least one battery with a particular battery strength and storage capacity and a particular charge time is connected with the charge controller where the capacity of the at least one battery is used to adjust the charge controller such that the at least one battery is charged to a selected maximum battery strength and storage capacity and where the number of batteries is selected to match the maximum power out from the power generation device such that the batteries are charged in a minimum charge time. A DC power port is connected with the at least one battery. An inverter is connected with the at least one battery for converting DC to AC and providing AC power where the inverter is adjustable so as to monitor the power status of the at least one battery and power demand and accepts power directly from the power generation device when the at least one battery is fully charged or accepts power directly from the at least one battery when the power generation device is not producing power and further, when no power is demanded, it directs power from the power generation device to the at least one battery when the at least one battery is below a preselected maximum power level. And an AC power is port connected with the inverter.

All terms used herein are given there common meaning as known to those of ordinary skill in the art and as discussed and described more fully herein.

According to another aspect of the invention, the power generation device is selected from a group devices consisting of: solar, wind and geothermal.

In another aspect, the charge controller monitors battery status including battery temperature and battery voltage and is adjustable to disconnect the power generation device when battery temperature and battery voltage are at maximum limits.

In one aspect, at least one safety breaker is connected between the power generation device and the charge controller. In another aspect, a safety breaker is provided between the power generation device and the charge controller; between the charge controller and the at least one battery; between the at least one battery and the inverter; and between the inverter and the AC power port.

In one aspect, the AC power port includes a breaker box with outlets selected from a group consisting of: 110 V power outlet and 220 V power outlet. In another aspect, an end user power demand calculation is provided where the end user power demand calculation is used to determine required power generation device capacity and battery capacity.

In one aspect, the power generation device produces approximately 45 amps and the charge controller continuously sends 45 amps to the at least one battery where the at least one battery is conformed to accommodate up to 45 amps. In another aspect, the at least one battery is a 12V battery.

According to another embodiment of the invention, an improved supplemental electrical generation apparatus consists of a solar power generation device conformed to produce approximately 45 amps. A charge controller is connected with the power generation device where the charge controller is adjustable so as to regulate power from the power generation device to continuously provide approximately 45 amps output from the charge controller. A pair of 12 V batteries is connected with the charge controller such that the pair of 12 V batteries are charged to maximum battery strength and such that the batteries are charged in a minimum charge time. A DC power port is connected with the pair of 12 V batteries. An inverter is connected with the pair of 12 V batteries for converting DC to AC and providing AC power where the inverter is adjustable so as to monitor power status of the pair of 12 V batteries and power demand and accepts power directly from the power generation device when the pair of 12 V batteries are fully charged or accepts power directly from the pair of 12 V batteries when the power generation device is not producing power and further, when no power is demanded, it directs power from the power generation device to the pair of 12 V batteries when the pair of 12 V batteries are below a preselected maximum power level. And an AC power port is connected with the inverter and, finally, where in combination the apparatus produces approximately 500 Watt hours of power.

In one aspect, the number of solar power generators and 12 V batteries is doubled such that in combination the apparatus produces approximately 1000 Watt hours of power.

In another aspect, the charge controller monitors battery status including battery temperature and battery voltage and is adjustable to disconnect the power generation device when battery temperature and battery voltage are at maximum limits.

In a further aspect, at least one safety breaker is connected between the power generation device and the charge controller. In another aspect, a safety breaker is provided between the power generation device and the charge controller; between the charge controller and the pair of 12 V batteries; between the pair of 12 V batteries and the inverter; and between the inverter and the AC power port.

In one aspect, the AC power port includes a breaker box with outlets selected from a group consisting of: 110 V power outlet and 220 V power outlet. In another aspect, the solar power generation device is a solar panel that is adjustable to track the sun's movement.

According to another embodiment of the invention, an improved supplemental electrical generation method consists of the steps of:

a. providing a power generation device; a charge controller connected with the power generation device wherein the charge controller is adjustable so as to regulate power from the power generation device to maximum amounts acceptable for charging a particular battery; at least one battery with a particular battery strength and storage capacity and a particular charge time, the at least one battery connected with the charge controller where the capacity of the at least one battery is used to adjust the charge controller such that the at least one battery is charged to a selected maximum battery strength and storage capacity and where the number of batteries is selected to match the maximum power out from the power generation device such that the batteries are charged in a minimum charge time; a DC power port connected with the at least one battery; an inverter connected with the at least one battery for converting DC to AC and providing AC power where the inverter is adjustable so as to monitor power status of the at least one battery and power demand and accepts power directly from the power generation device when the at least one battery is fully charged or accepts power directly from the at least one battery when the power generation device is not producing power and further, when no power is demanded, it directs power from the power generation device to the at least one battery when the at least one battery is below a preselected maximum power level; and an AC power port connected with the inverter; and b. activating the power generation device such that power is directed to the DC and AC power ports.

In one aspect, the power generation device is a solar panel that produces approximately 45 amps and the at least one battery is a pair of 12 V batteries such that in combination one solar panel and two 12 V batteries produce approximately 500 Watt hours of power.

In another aspect, the AC power port includes a breaker box with outlets selected from a group consisting of: 110 V power outlet and 220 V power outlet.

In a further aspect, the method includes the use of an end user power demand calculation where the end user power demand calculation is used to determine required power generation device capacity and battery capacity.

DESCRIPTION OF THE DRAWINGS

Other objects, features and advantages of the present invention will become more fully apparent from the following detailed description of the preferred embodiment, the appended claims and the accompanying drawing in which:

FIG. 1 is a schematic diagram of the improved supplemental electrical generation apparatus of the present invention.

DETAILED DESCRIPTION OF THE INVENTION

The preferred embodiment of the present invention is illustrated by way of example in FIG. 1. With specific reference to FIG. 1, according to a preferred embodiment, improved supplemental electrical generation apparatus 10 includes a power generation device 12. Power generation device 12 is, preferably, a solar panel 14. Applicants' supplemental electrical generation apparatus 12, however, will function well with any alternative energy source, such as wind power and geothermal, for example only and not by way of limitation. These energy sources are well known and not disclosed more fully hereafter except to say that the power they produce must be introduced to the apparatus as detailed in the following discussion with regard to solar panel 14.

Solar panel 14 is any solar panel device now known or hereafter developed. The Applicants have found that the preferred solar panel 14 is a KOYCERA brand solar panel the produces 10 amp DC in direct sunshine, 8.55 amp DC on a cloudy day and up to 7 amp DC even on rainy days. It is wind rated up to 155 MPH and can withstand one inch hail at 51 MPH. Each panel weighs about forty-five pounds and is about forty inches wide by sixty-five and one-half inches long by two inches deep. Supported by a stand 16 it included a panel pitch adjustment gear 18 to enable a user to continuously direct the panel most accurately to the sun.

DC power generated by solar panel 14 is sent from solar panel 14, preferably through safety breaker 20, to charge controller 22. Safety breaker 20 prevents the back flow of electricity and to isolate elements of the invention when needed to work on the apparatus. Other safety breakers 20 are located throughout the system as will be more fully discussed hereafter and as are illustrated in FIG. 1.

DC electrical current is directed from the power generation device 12 to the charge controller 22. Charge controller 22 is adjustable to control the maximum amount of power sent through the charge controller to the rest of the apparatus. Applicants have found that this is one of the important improvements of the present invention. That is, prior art systems simply pass on what is produced and very little concern is given to the amount of power that is allowed to be passed through. Once it is known what the power output of the power generation device 12 is, charge controller 22 is adjusted to accommodate that particular output as a first step in harmonizing the separate components of the invention. Again, Applicants have found that this harmonization between the power generation device 12 and the charge controller is rarely if ever done. It, again, is one step. Other steps in harmonization are described hereafter.

Power is directed from charge controller 22 through a safety breaker 20 to a power storage bank 24 consisting of at least one battery 26. Applicants have determined that with a single preferred solar panel 14, as described above, the preferred storage bank 24 consists of two 12 V deep cycle AGM batteries 26. The charging of the batteries 26 depends on the power of the solar panel 14. Here Applicants have introduced a second point of harmonization heretofore missing from prior art systems. Applicants determine the battery strength and storage capacity and adjust the charge controller 22 to provide current to the batteries 26 so that a minimum of time is required to charge the batteries 26. For example, the basic unit of preferred elements as just described will include a determination that a pair of 12V deep cycle AGM batteries 26 will charge fastest when a continuous charge of 45 amps is delivered to them from solar panel 12. Solar panel 12, in its preferred embodiment as described, is capable of producing a more or less continuous 45 amps output. Charge controller 22 regulates the input to a continuous output and the harmonized system recharges faster than any known system. Instead of hours and hours, Applicants have determined that this system can go from low battery to fully charged in approximately fifteen minutes. Certainly, there is a tradeoff in that the system will not run as long on two batteries as it would with more.

Here is where Applicants' invention is a significant improvement of the art in that it is fully scalable. If the end user requires more power than the preferred embodiment of one solar panel and two batteries can deliver, a second "unit" can be added to double the power while still maintaining extremely rapid recharge rates, among other advantages as will be more fully discussed hereafter.

From power storage bank 24 DC power is sent through safety breaker 20 to one of two places. Applicants have found that not all prior art systems provide for direct DC power takeoff. Applicants' invention does. After safety breaker 20 DC power is directed to a DC power port 28. Dc power port 28 may be used to power yard lights, pool pumps or any device that operates on DC power. This feature significantly expands the usefulness of this system and is a distinct advantage over prior art systems especially since DC power is also directed to inverter 30. Inverter 30 is adjustable to convert DC power in to AC power out in an amount desired. Here is another point of Applicants' invention where the system is "harmonized" for maximum effective usefulness based on the requirements of the particular situation. For example only and not by way of limitation, the inverter 30 directs AC power to a breaker box 32. From breaker box 32 the power may be directed to 110V power outlets 34 and/or 220V power outlets 36. In the harmonized preferred embodiment described above with one preferred solar panel 14 and two preferred 12V deep cycle AVG batteries 26, the apparatus produces approximately 500 Watt hours of power. Should more power be required, Applicants' invention is fully scalable such that when the number of solar power generators 14 and 12 V batteries 26 is doubled the apparatus produces approximately 1000 Watt hours of power. Again, the system is internally adjusted at the charge controller 22 and the inverter 30 to conform to the particular components used in the apparatus and to accommodate the required power demands of the user. Once the power demand is known and appropriate power generation device 12 and power storage bank are selected. They are selected to ensure compatibility and to effectuate the biggest power output with the shortest possible recharge time. Once these components have been selected and harmonized, they are fully scalable should power requirements increase.

For example, Applicants have determined that the preferred, harmonized, system produces predictable and scalable results. A 1,000 Watt hours average only needs a two panel/four battery system as described above in their preferred embodiments. A 2,000 Watt hour use would call for a four panel/eight battery system. The Kilowatt inverter 30 size is adjustable and is calculated as follows: Take the Kilowatt hours, listed on the power bill and divide it by 30, for the average days in a month. This will tell how many kilowatts are being used each day and then divide that by 4 to see the size Kw inverter needed. EXAMPLE: If a person is using 1800 Kw per month, divide this by 30 and you get 60. If you then divide the 60 by 4, you will get 15. This user will need 15 Kw system. Preferred inverters are 5,8,10, 16 KW inverter systems. A 16 Kw inverter would therefor be used for this customer. A 16 Kw system comes with four solar panels and eight batteries. If this user wants to have a longer storage of stored energy, more batteries may be provided. A standard preferred system requires that for each two extra batteries 26, one extra solar panel 14 is added.

By way of further description, Applicants have found that their improved supplemental electrical generation apparatus and method produces more electrical power, at a more economical rate and with less complication than any other power generation device.

In general the present invention is an electrical provider that consists of one, or more, solar panels and two, or more, batteries, that is built on a frame/with wheels. The solar panels are preferably connected to a movable framework. Batteries can be added, depending on the amount of time desired for reserve use, in a bank system.

This system is ideal for use with or without the local power grid. It can easily take the place of any gasoline or diesel generator. It can be moved in and out, as needed. It requires no fuel, other than the sun, wind or geothermal to operate. Hunters and fishermen, who have camps in remote locations with no grid availability, will be able to provide their camps with electrical power. Locations that have grid connections will be able to have electrical power at very little, or no, charge from the local power company and thus be able to reduce their demand from the grid.

In operation the apparatus is moved to the desired location in the sun, the batteries are connected, and you can plug in your needed electrical appliances. It is available in 220 or 110V units. It automatically switches from the solar panels to the batteries, or to the grid if necessary. The number of solar panels used will determine how fast the batteries will charge. The number of batteries determines the length of reserve time available for use. In the preferred embodiment, Applicants have determined that a single panel with two batteries will operate on battery reserve power for about ten consecutive hours, depending on the electrical demands of the user.

Applicants have determined that the preferred embodiment is very "inexpensive". A single panel system, with two batteries ready to go to work, will cost approximately $4400. This unit can easily be moved from a camp to a home, if needed after a storm or other disasters. It will provide immediate electricity after a hurricane, for example. The unit may be moved from one home to another. The invention will power a home, a camp or camper, as the user chooses. The present invention burns no gas or diesel, which is often not available in rural areas or after a storm. The present invention will save money on electric bills and will not pollute the atmosphere.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. An improved supplemental electrical generation apparatus comprising:
    a. a power generation device;
    b. a charge controller connected with said power generation device wherein said charge controller is adjustable so as to regulate power from said power generation device to maximum amounts acceptable for charging a particular battery;
    c. at least one battery with a particular battery strength and storage capacity and a particular charge time, said at least one battery connected with said charge controller wherein the storage, capacity of said at least one battery is used to adjust said charge controller such that said at least one battery is charged to a selected maximum battery strength and storage capacity and wherein a number of batteries is selected to match a maximum power out from said power generation device such that said batteries are charged in a minimum charge time;
    d. a DC power port connected with said at least one battery;
    e. an inverter connected with said at least one battery for converting DC to AC and providing AC power wherein said inverter is adjustable so as to monitor power status of said at least one battery and power demand and accepts power directly from said power generation device when said at least one battery is fully charged or accepts power directly from said at least one battery when said power generation device is not producing power and further, when no power is demanded, it directs power from said power generation device to said at least one battery when said at least one battery is below a preselected maximum power level; and
    f. an AC power port connected with said inverter.

2. The apparatus of claim 1 wherein said power generation device is selected from a group of devices consisting of: solar, wind and geothermal.

3. The apparatus of claim 1 wherein said charge controller monitors battery status including battery temperature and battery voltage and is adjustable to disconnect said power generation device when battery temperature and battery voltage are at maximum limits.

4. The apparatus of claim 1 further including at least one safety breaker connected between said power generation device and said charge controller.

5. The apparatus of claim 1 further including a safety breaker between said power generation device and said charge controller; between said charge controller and said at least one battery; between said at least one battery and said inverter; and between said inverter and said AC power port.

6. The apparatus of claim 1 wherein said AC power port includes a breaker box with outlets selected from a group consisting of: 110 V power outlet and 220 V power outlet.

7. The apparatus of claim 1 further consisting of an end user power demand calculation wherein said end user power demand calculation is used to determine required power generation device capacity and battery capacity.

8. The apparatus of claim 7 wherein said power generation device produces approximately 45 amps and the charge controller continuously sends 45 amps to said at least one battery wherein said at least one battery is conformed to accommodate up to 45 amps.

9. The apparatus of claim 8 wherein said at least one battery is a 12V battery.

10. An improved supplemental electrical generation apparatus comprising:
    a. a solar power generation device conformed to produce approximately 45 amps;
    b. a charge controller connected with said solar power generation device wherein said charge controller is adjustable so as to regulate power from said solar power generation device to continuously provide approximately 45 amps output from said charge controller;
    c. a pair of 12 V batteries connected with said charge controller such that said pair of 12 V batteries are charged to a maximum battery strength and such that said batteries are charged in a minimum charge time;
    d. a DC power port connected with said pair of 12 V batteries;
    e. an inverter connected with said pair of 12 V batteries for converting DC to AC and providing AC power wherein said inverter is adjustable so as to monitor power status of said pair of 12 V batteries and power demand and accepts power directly from said solar power generation device when said pair of 12 V batteries are fully charged or accepts power directly from said pair of 12 V batteries when said solar power generation device is not producing power and further, when no power is demanded, it directs power from said solar power generation device to said pair of 12 V batteries when said pair of 12 V batteries are below a preselected maximum power level; and f. an AC power port connected with said inverter and wherein in combination said apparatus produces approximately 500 Watt hours of power.

11. The apparatus of claim 10 wherein a number of solar power generators and 12 V batteries is doubled such that in combination said apparatus produces approximately 1000 Watt hours of power.

12. The apparatus of claim 10 wherein said charge controller monitors battery status including battery temperature and battery voltage and is adjustable to disconnect said solar power generation device when battery temperature and battery voltage are at maximum limits.

13. The apparatus of claim 10 further including at least one safety breaker connected between said solar power generation device and said charge controller.

14. The apparatus of claim 10 further including a safety breaker between said solar power generation device and said charge controller; between said charge controller and said pair of 12 V batteries; between said pair of 12 V batteries and said inverter; and between said inverter and said AC power port.

15. The apparatus of claim 10 wherein said AC power port includes a breaker box with outlets selected from a group consisting of: 110 V power outlet and 220 V power outlet.

16. The apparatus of claim 10 wherein said solar power generation device is a solar panel that is adjustable to track the sun's movement.

17. An improved supplemental electrical generation method comprising:

a. providing a power generation device; a charge controller connected with said power generation device wherein said charge controller is adjustable so as to regulate power from said power generation device to maximum amounts acceptable for charging a particular battery; at least one battery with a particular battery strength and storage capacity and a particular charge time, said at least one battery connected with said charge controller wherein the storage capacity of said at least one battery is used to adjust said charge controller such that said at least one battery is charged to a selected maximum battery strength and storage capacity and wherein a number of batteries is selected to match a maximum power out from said power generation device such that said batteries are charged in a minimum charge time; a DC power port connected with said at least one battery; an inverter connected with said at least one battery for converting DC to AC and providing AC power wherein said inverter is adjustable so as to monitor power status of said at least one battery and power demand and accepts power directly from said power generation device when said at least one battery is fully charged or accepts power directly from said at least one battery when said power generation device is not producing power and further, when no power is demanded, it directs power from said power generation device to said at least one battery when said at least one battery is below a preselected maximum power level; and an AC power port connected with said inverter; and b. activating said power generation device such that power is directed to said DC and AC power ports.

18. The method of claim 17 wherein said power generation device is a solar panel that produces 45 amps and said at least one battery is a pair of 12 V batteries such that in combination one solar panel and two 12 V batteries produce approximately 500 Watt hours of power.

19. The method of claim 17 wherein said AC power port includes a breaker box with outlets selected from a group consisting of: 110 V power outlet and 220 V power outlet.

20. The method of claim 17 further consisting of an end user power demand calculation wherein said end user power demand calculation is used to determine required power generation device capacity and battery capacity.

* * * * *